United States Patent [19]
Glasser et al.

[11] Patent Number: 5,874,551
[45] Date of Patent: Feb. 23, 1999

[54] METHOD OF MAKING ESTER-CROSSLINKED CHITOSAN SUPPORT MATERIALS AND PRODUCTS THEREOF

[75] Inventors: Wolfgang G. Glasser; Rajesh K. Jain, both of Blacksburg, Va.

[73] Assignee: Center for Innovative Technology, Herndon, Va.

[21] Appl. No.: 654,929

[22] Filed: May 29, 1996

[51] Int. Cl.⁶ ............................ C08B 37/08; C08G 63/48; C08G 63/91
[52] U.S. Cl. .......................................... 536/20; 525/54.21
[58] Field of Search ............................. 536/20; 525/54.21

[56] References Cited

U.S. PATENT DOCUMENTS

| | | |
|---|---|---|
| 2,217,823 | 10/1940 | Thor . |
| 3,948,823 | 4/1976 | Lee et al. . |
| 3,962,158 | 6/1976 | Mima et al. . |
| 4,029,727 | 6/1977 | Austin et al. . |
| 4,309,534 | 1/1982 | Austin ........................................ 536/20 |
| 4,879,340 | 11/1989 | Moriguchi et al. ..................... 525/54.2 |
| 5,021,207 | 6/1991 | De Lucca et al. ....................... 264/186 |
| 5,114,788 | 5/1992 | Nakagawa et al. ..................... 428/284 |
| 5,283,064 | 2/1994 | Suzuki et al. ........................... 424/451 |
| 5,306,550 | 4/1994 | Nishiyama et al. .................... 428/288 |

OTHER PUBLICATIONS

Hosokawa et al., Ind. Eng. Chem. Res., 29:800–805 1990.
Hosokawa et al., Ind. Eng. Chem. Res., 30:788–792 1991.
Isogai et al., Carbohydrate Polymers, 19:25–28 1992.
Hasegawa et al., J. Appl. Poly. Sci., 45:1873–1879 1992.
Hirano et al., Science News, vol. 44, pp. 74.
A. Toffey et al., "Heat Induced Conversion of Chitosan to Chitin," presented at ACS Chem. Soc. Div. of Cellulose, Paper and Textile, No. 066, 209th ACS National Meeting, Anaheim, CA Apr. 2–6, 1995.

*Primary Examiner*—Nathan M. Nutter
*Attorney, Agent, or Firm*—Whitham, Curtis & Whitham

[57] ABSTRACT

Chitosan support material is crosslinked using a heat-induced, amidification reaction in non-aqueous solvent. Crosslinking is achieved by the use of dicarboxylic acids which form amide bonds with chitosan. The type and degree of crosslinking can be controlled to tailor mechanical strength, solubility, and functionality, of the resulting chitosan support material. Quaternization and/or cyclodextrin-modification functionalization of the chitosan beads can also be effected in addition to the crosslinking to produce separation materials with great versatility and utility. The invention is applicable to chitosan support materials of various solids contents and geometrical shapes such as beads, fibers, films, and adhesive coatings.

15 Claims, 6 Drawing Sheets

FIG. 2

REACTION SCHEME 2

FIG.3 REACTION SCHEME 3

CYCLODEXTRIN-MODIFIED, QUATERNIZED CHITOSAN BEAD

METHOD OF MAKING ESTER-CROSSLINKED CHITOSAN SUPPORT MATERIALS AND PRODUCTS THEREOF

BACKGROUND OF THE INVENTION

1. Field of the Invention

The invention is generally related to a method for forming crosslinked chitosan support materials, including crosslinked and functionalized chitosan support materials, and crosslinked chitosan products obtained by this method.

2. Description of the Related Art

Hydrogel beads are products frequently prepared from polysaccharides, especially agarose, dextran and cellulose. Hydrogel beads from chitosan are also generally known.

Chitosan is the acid-soluble deacetylation product of chitin. For example, chitosan is the product of alkaline hydrolysis of abundant chitin produced in the crab shelling industry. Chitosan, a biopolymer soluble in dilute (0.1 to 10%) solutions of carboxylic acids, such as acetic acid, is readily regenerated from solution by neutralization with alkali. In this manner, chitosan has been regenerated and reshaped in the form of films, fibers, and hydrogel beads. For instance, chitosan beads are prepared in one conventional method by precipitating dilute solution of chitosan in acetic acid into alcoholic or aqueous sodium hydroxide followed by solvent exchange with water.

However, in contrast to beads from cellulose, which are insoluble in most organic solvents, acids and bases, chitosan retains the solubility in dilute acids of the parent biopolymer. This solubility is typically overcome by inducing crosslinking. A conventional chitosan crosslinking reaction involves dialdehydes, such as glutaraldehyde, or diglycidyl ethers, such as butanediol diglycidyl ether, or epoxides like epichlorohydrin. Chitosan beads crosslinked with diglycidyl ethers are commercially available under the trade name CHITOPEARL, as manufactured by Fuji Spinning, Ltd., Japan.

Also, various researchers have discussed blending chitosan and cellulose to produce biodegradable films (see, for example, U.S. Pat. No. 5,306,550 to Nishiyama et al.; Hosokawa et al., *Ind. Eng. Chem. Res.*, 29:800–805 (1990); Hasegawa et al., *J. Appl. Polym. Sci.*, 45:1873–1879 (1992)). Though cellulose contains only trace amounts of carbonyl groups, these trace amounts of carbonyl groups are suspected in the art to play an important role in crosslinking to chitosan to form a crosslinked polymeric network of cellulose and chitosan.

Also, it has been demonstrated that complexes of chitosan with acetic acid (viz., chitosonium acetate) are converted to chitin (i.e., the N-acetylamide of chitosan) by a heat-catalyzed amidification or dehydration reaction, in U.S. application Ser. No. 08/435,866 to Glasser et al., filed May 5, 1995. The amidification reaction described in U.S. application Ser. No. 08/435,866 converts acid-soluble chitosan into acid-insoluble chitin.

Because chitosan is easily solubilized and processed, a great deal of research in the hydrogel field has been devoted to experimentation with and/or use of chitosan in a wide variety of applications. Therefore, the art would be highly interested in a new technique to form crosslinked chitosan support material, such as crosslinked chitosan beads, in a simplified, reliable manner.

SUMMARY OF THE INVENTION

It is an object of this invention to provide a facile, reliable method for forming crosslinked chitosan support material without sacrificing or distorting the original shape of the support material.

Briefly and in general terms, chitosan support material is crosslinked according to the invention using a heat-induced amidification reaction in non-aqueous solvent. Crosslinking is achieved by the use of dicarboxylic acids or acid anhydrides thereof which form amide bonds with chitosan. The type and degree of crosslinking can be controlled to tailor mechanical strength, solubility, and functionality of the resulting chitosan support material. The invention is applicable to chitosan support materials of various geometrical shapes, including bead, fiber, and film shapes.

In one preferred embodiment of the invention, chitosan support material is crosslinked by the following steps, in this sequence:

(a) the chitosan support material is solvent-exchanged from an original aqueous environment into a non-aqueous (anhydrous) environment such as organic alcohol, ether, or hydrocarbon;

(b) the solvent-exchanged chitosan support material is mixed with a dicarboxylic acid or an acid anhydride thereof to form a chitosonium ion complex; and (c) the chitosonium ion complex is heated to a temperature and for a duration effective to crosslink the chitosan support material.

The crosslinked chitosan product retains the integrity of its "preshape", and it is insoluble to alkali as well as dilute acid or neutral pH water.

In above-indicated heating step (c), the chitosan/dicarboxylic acid complex (or acid anhydride complex thereof) is heated in dilute suspension (i.e., as solids in non-aqueous environment) to initially produce a monocarboxylic acid derivative which is not yet crosslinked as an intermediate reaction product, which, upon further heating, produces a non-carboxylic diamide which is fully crosslinked.

The present invention is predicated on the concept of crosslinking chitosan material by removing water via amidification reaction from a chitosonium complex thereof with dicarboxylic acids or their corresponding acid anhydrides by heating in the presence of an anhydrous solvent. The dicarboxylic acid (or acid anhydride), when reacted at both dicarboxylic functionalities with chitosan by means of a heating procedure of the inventive method, results in an inter-molecular reaction with two equivalents of amines to form a crosslinked chitosan material.

Preferably, but not mandatorily, the dicarboxylic acid or acid anhydride thereof used in the inventive method include those possessing a polymerizable double bond(s), and more preferably those dicarboxylic acids and anhydrides thereof that are $\alpha,\beta$-unsaturated carbonyl compounds. The presence of a polymerizable double bond in the main chain or backbone of the dicarboxylic acid or acid anhydride tends to promote network formation and thus facilitate crosslinking of the chitosan. Suitable dicarboxylic acids or acid anhydrides thereof for use in the present invention include, for example, maleic acid, maleic anhydride, itaconic acid, itaconic anhydride, citraconic acid, citraconic anhydride, and mixtures thereof.

The inventive method makes it possible to control both solubility and strength characteristics of chitosan support materials without sacrificing the bulk of the amine functionalities. Additionally, carboxylated crosslinked chitosan gels are formed by the invention without distorting the original shape (preshape) of the chitosan support material. Also, the chitosan support material is crosslinked with dicarboxylic acids or acid anhydrides thereof capable of forming a carboxylic acid group containing hydrogel inside a polysaccharide gel by a polymerization mechanism which leaves other functionalities largely intact (such as by chain growth polymerization), and available for derivatization and functionalization.

In addition to the crosslinking of chitosan hydrogels induced by the inventive method, chitosan beads of the invention can additionally be subjected to activation reactions which result in altered functionality and/or altered solubility. For instance, chitosan beads in solid form, in non-aqueous suspension, can be reacted with a quaternizing reagent in a step prior to the induction of the crosslinking according to the invention in order to enhance the sorption properties of the beads. Advantageously, the crosslinking procedure of the invention nullifies any solubility problems that otherwise would be raised by interposing such a functionalization. In a further embodiment, quaternized chitosan beads of the invention can be even further functionalized with cyclodextrin prior to the induction of the crosslinking according to the invention to form beads well-suited to chiral separations, among other things.

Crosslinked beads made by the invention are effective chromatographic support materials, and, as such, can be used for separations in biotechnology (e.g., protein separations). Crosslinked beads of the invention are also useful as adsorbents in waste water purification and cleanup, heavy metal concentration and removal, and pesticide complexation.

BRIEF DESCRIPTION OF THE DRAWINGS

The foregoing and other objects, aspects, features, and advantages of the present invention will be better understood from the following detailed description of the preferred embodiments of the invention with reference to the drawings, in which.

DETAILED DESCRIPTION OF THE PREFERRED EMBODIMENTS OF THE INVENTION

Chitosan, as a starting material of the inventive method, is commercially available from a wide variety of sources including under the trade name VANSON of Redmond, Washington, and PROTAN of Woodinville, Washington. Alternatively, the chitosan starting material can be made by any convenient conventional method, such as by hydrolyzing chitin in a concentrated solution of sodium hydroxide on heating and then recovering chitosan by filtration and water washing. The chitosan starting material is soluble in dilute acids but not soluble in neutral water or alkali. Chitosan is an amorphous solid which is more soluble in water having a pH less than 6, than chitin, but chitosan usually requires the use of aqueous organic acids to attain solubility.

Chitosan is a glucose amine polymer. The chemical structure of chitosan has a repeating structural unit that is represented by Formula (I) as follows:

where n is greater than 3.

The chitosan starting material can theoretically be substituted or unsubstituted at the ring hydroxy moiety or the hydroxy methyl moiety. These substituents may represent ethers, esters, carbamates, or other types. The important feature is that the chitosan has a majority of free, primary amine groups along its polymeric backbone to form ionic complexes with the dicarboxylic acids or acid anhydrides thereof. Preferably the chitosan has a weight-average molecular weight ($M_W$) ranging from about $10^4$ to about $10^6$; although the molecular weight may be varied depending on the ultimate use envisaged for the crosslinked chitosan product.

The chitosan starting materials can be porous or nonporous, and have a geometrical shape that can be regular or irregular, depending at least in part on the ultimate usage of the support material envisaged.

For the sake of convenience and illustration, the description herein will occasionally refer to the chitosan support material in the context of beads, although it is to be understood that the invention is not necessarily limited to that configuration.

The solid chitosan starting material is dissolved in a weak organic acid, such as 1 to 5 wt. % acetic acid, formic acid, and the like, to provide a chitosan solution. Bead form chitosan hydrogels are formed from the chitosan solution by atomizing the solution of chitosan in aqueous alkali (e.g., 0.1 to 2.0N sodium hydroxide solution). The hydrogel beads formed are decanted, filtered, washed and stored in distilled water for subsequent treatment. The dissolved chitosan starting material, in hydrogel form, is solvent-exchanged with a non-aqueous liquid solvent to displace water from the chitosan support material (e.g., beads) and create anhydrous conditions within the support material (e.g., beads). Suitable non-aqueous solvents for this purpose include alcohols (e.g., isopropyl alcohol), acetone, dioxane, chloroform, benzene, tetra-hydrofuran, toluene, and xylene. This solvent-exchange procedure is performed prior to performing any optional functionalization step and the required crosslinking step of the invention. The presence of water, especially as a medium, is undesired during the amidification reaction as it slows down the reaction and lowers the degree of crosslinking attained. Trace amounts of water left as residue in the solvent-exchanged beads seldom raise this problem. However, if residual traces of water in the solvent-exchanged beads interfere with crosslinking (such as indicated by alkali solubility in the final product), the traces of water can be more rigorously removed and excluded by taking precautions such as employing freshly cut potassium or sodium metal as a dessicant in the non-aqueous solvent being used to replace the water. Also, moisture indicators, such as benzophenone, optionally can be used to assist in determining conditions sufficiently anhydrous for reactions to proceed expediently and efficiently.

Also, the practice of this invention preferably involves usage of "never-dried" hydrogel beads from chitosan through the course of the inventive method(s). The terminology "never-dried", as used herein, means beads which have the bead and pore size of beads which have not been subjected to water removal (dehydration) or organic solvent removal to leave the beads devoid of liquid solvent, whether aqueous or non-aqueous, at any given time before or during processing to permit drying thereof. Drying of the beads is undesired as it causes shrinkage and thus size reduction in the beads, which effect is not completely reversible upon rehydration or upon combination with a polar organic solvent.

In any event, once solvent-exchanged, the chitosan material is combined with a dicarboxylic acid or acid anhydride thereof to form a chitosonium ion complex that is water soluble. Although not part of the present invention, the chitosonium ion complex, prior to being heated, will behave in a manner similar to gum or ionic starch if dissolved in water.

When the chitosan starting material and the dicarboxylic acid or acid anhydride thereof are combined, they interact at the primary amine of the chitosan starting material to produce a chitosonium ion complex. For example, in the case of maleic anhydride being combined with chitosan, chitosonium maleate is formed. The chitosan/dicarboxylic acid complex is water-soluble at a pH above 8.

Once the chitosonium ion complex is formed, heat is applied to induce amidification of chitosonium ion complex to form an intermediate product. The intermediate product is schematically shown as the product of step 1 in Reaction Scheme 1 depicted in FIG. 1. Reaction Scheme 1 is a schematic representation of the reaction of chitosan with anhydrides. Step 1 is fast, and Step 2 requires the presence of polymerizable (i.e., double) bonds that react faster than Step 2b. The Step 2a and 2b-reactions are promoted by the size of the anhydride cycle and by water removal.

The source of heat can be applied in any convenient manner to the chitosonium ion complex. The chitosonium ion complex can be heated in a reaction vessel by use of conventional laboratory or industrial heating arrangements for liquid reaction baths, as appropriately selected for the desired scale of the operation. The heating system can be either an open or closed system.

The heating temperature applied to the reaction bath through all stages of the crosslinking reaction (i.e., steps 1 and 2; or steps 1, 2a and 2b) preferably is maintained at a constant value. The reaction temperature and duration of heating to effect crosslinking of the chitosan according to the inventive method will depend in large part upon the non-aqueous solvent (and its boiling point) involved and the degree of crosslinking desired. The reaction temperature generally will range between 40° to 160° C. depending on the particular non-aqueous solvent. For example, where isopropyl alcohol is the liquid medium exchanged for water in the chitosan hydrogel, the crosslinking reaction temperature preferably is approximately 80° C., and the heating time generally is about 15 to 50 hours, usually about 16 to 24 hours to effect complete crosslinking of chitosan hydrogel beads.

As to the intermediate product of step 1, the application of heat initially converts ammonium organic acid ionic groups of the chitosonium ion complex to N-organic acid groups. Thus, a non-crosslinked monocarboxylic acid derivative is formed as an intermediate product derived during an incipient phase of the heating procedure from the partial amidification of chitosonium ion complex. The proportion of the chitosonium ion complex functionalized in this way upon completion of the first step (step 1) of the heating procedure is variable, although high levels of functionalization are typically targeted and achieved in practice. The intermediate reaction product of step 1 of the inventive method, i.e., the noncrosslinked monocarboxylic derivative, remains insoluble in neutral water and becomes insoluble in acids while being soluble in dilute alkali as attributable to the carboxyl functionality.

For example, where maleic anhydride is used, chitosan maleate is formed upon completion of step 1 as the initial phase of the heating procedure. That is, ammonium maleate groups at primary amines are converted to chitosan N-maleayl groups. The resulting intermediate product is alkali soluble as attributable to the remaining carboxylic functionality of the added maleayl group.

Figure 1:
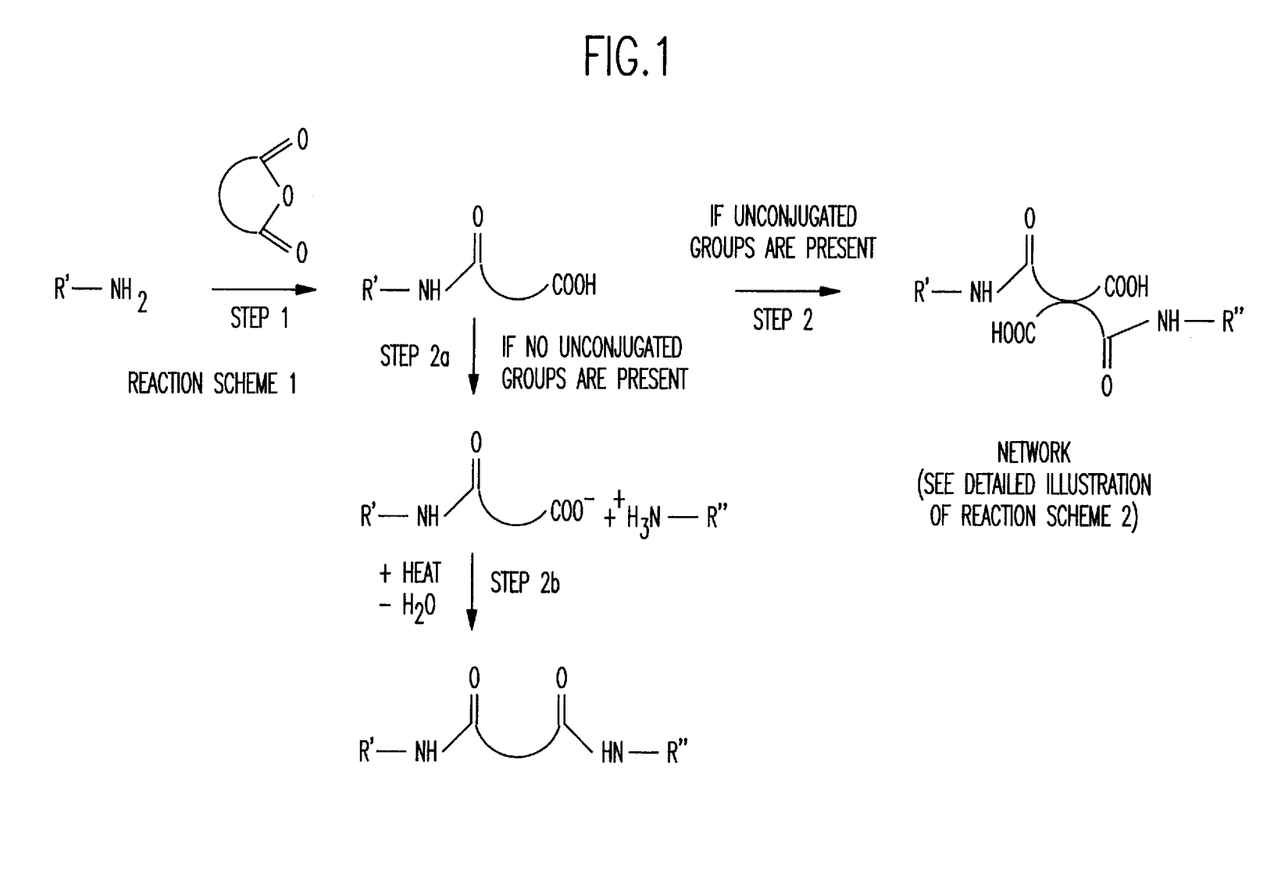
FIG. 1 is a schematic representation of a reaction of chitosan with anhydrides according to Reaction Scheme 1 of this invention.

As seen by reference to Reaction Scheme 1, intermolecular polymerization of the intermediate product of step 1 can proceed along two possible pathways depending on whether the dicarboxylic acid reactant or anhydride thereof has a polymerizable double bond(s). Advancement by Step 2 requires the presence of polymerizable double bonds in the dicarboxylic acid or anhydride thereof which will react faster than step 2b. The heating condition is maintained such that the polymerizable double bonds react with polymerizable double bonds on a neighboring intermediate product. The product of step 2 is an inter-molecular network formed from different monocarboxylic acid derivatives.

However, when dicarboxylic acids or anhydrides thereof lacking polymerizable double bonds are involved, then the reaction will advance through steps 2a and 2b to completion. To effectuate and complete the desired crosslinking reaction according to the pathway of steps 2a and 2b, the free carboxylic acid group of the non-crosslinked monocarboxylic acid derivative, i.e., the intermediate formed at step 1, is reacted with the $NH_2$ group of an adjacent chitosan molecule after first driving off a molecule of water. The reactions of Steps 2a and 2b are promoted by the size of the anhydride cycle and by the removal of water.

Therefore, as heating is continued in steps 2a and 2b, crosslinking is heat-induced between the monocarboxylic acid derivative intermediate product that has completed step 1 with nonfunctionalized chitosonium ion complex that is present. As with the intermediate formed by step 1 during initial phases of heating, the heating condition is also used to convert the anhydride to a monocarboxylic acid by amidification. However, the reaction that occurs in this later phase of heating of step 2b converts, inter-molecularly, the ammonium groups of a chitosonium ion complex (non-functionalized during initial heating) to N-acyl groups by reaction with the remaining free carboxyl functionality on a monocarboxylic acid derivative intermediate product. The dicarboxylic acid or acid anhydride thereof, is thus progressively and ultimately reacted with both carboxylic acid functionalities with two equivalents of amines, culminating in inter-molecular crosslinking as a second reaction stage reached in a later phase of the heating step. In this way, a fully crosslinked, non-carboxylic diamide is formed via steps 2a and 2b.

The resulting amidified, crosslinked chitosan complex of either step 2 or step 2b is swellable in aqueous or non-aqueous solvents, and it is insoluble in acids, bases or neutral water. Catalysts are not required for the first or second stages of the amidification reaction, although it is contemplated that certain catalysts could be used to promote either stage of this step, such as Lewis acids like $Al_2O_3$.

Since the noncrosslinked intermediate of step 1 is insoluble in dilute acid or neutral water but soluble in alkali, while the final product of the heating step, i.e., the crosslinked dicarboxylic derivative of step 2 or 2b, is insoluble in all solvents whether acids, neutral in pH, or bases, the progress and extent of the crosslinking (heat-induced amidification) reaction of the present invention can be easily monitored and assessed by routine solubility tests.

Figure 2:
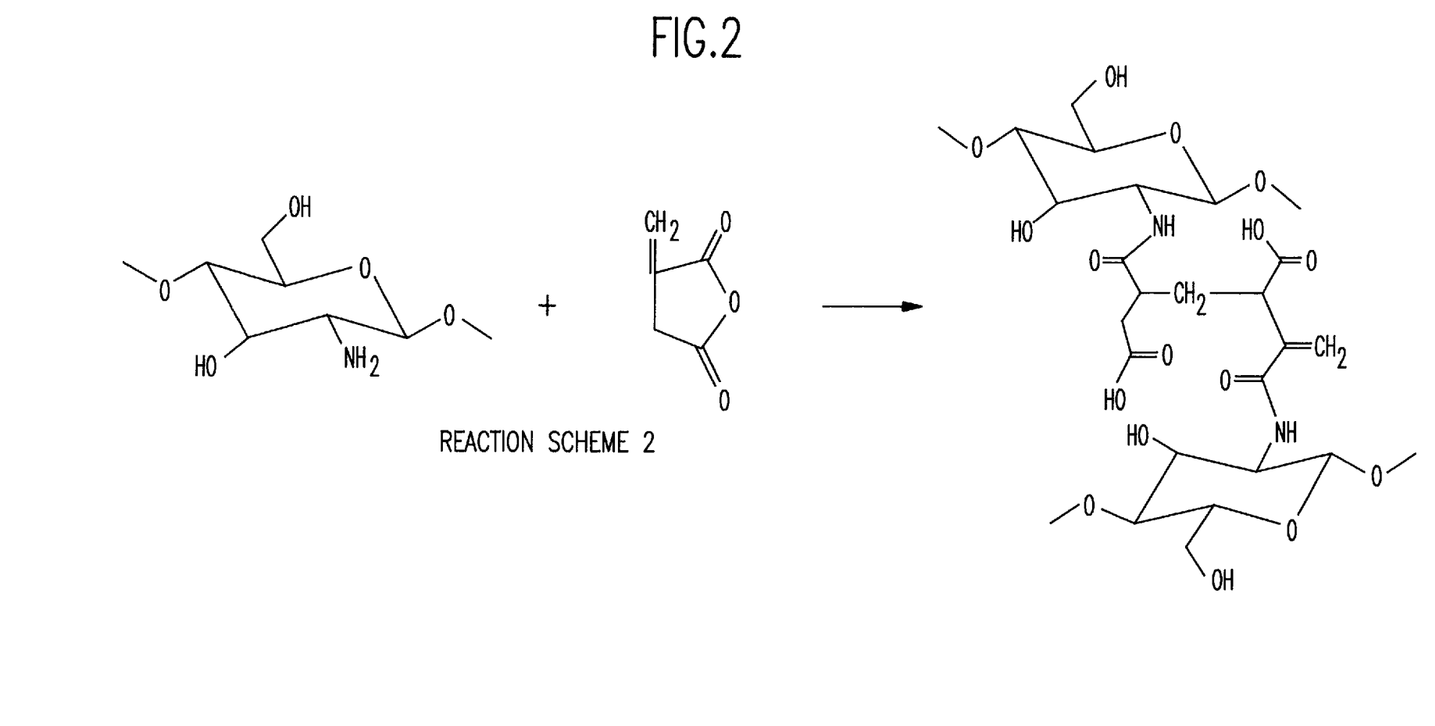
FIG. 2 is a schematic representation of a reaction to prepare a crosslinked chitosan hydrogel having free carboxylic groups from a difunctional dicarboxylic acid according to Reaction Scheme 2 of this invention.

It is to be borne in mind that the particular dicarboxylic acid anhydride depicted in Reaction Scheme 1, is merely representative. The dicarboxylic acids and acid anhydrides thereof described herein can be used and will inter-act with the chitosan material, and the ionic complex and intermediate derivatives thereof, consistent with general scheme shown in Reaction Scheme 1. For instance, Reaction Scheme 2 depicted in FIG. 2 illustrates a carboxylated, crosslinked chitosan gel made using itaconic acid, a difunctional dicarboxylic acid, for crosslinking where the crosslinked chitosan hydrogel has free carboxylic acid groups.

Crosslinked chitosan bead products of the inventive method, generally have a solids content, by weight, ranging from about 1.0% to about 10.0%, more preferably 1 to 3%, with the remainder being constituted by solvent. As saturated with water, it is preferred that crosslinked beads, either with or without quaternary functionalizations and/or cyclodextrin-modifications described herein, contain 1 to 3 wt. % solids and have an average particle diameter size greater than about 0.3 mm, more preferably ranging from about 0.5 mm to about 2.0 mm. Also, after crosslinking the chitosan material, as described herein, the crosslinked chitosan hydrogel can be exchanged back into aqueous medium (i.e., water), and the non-aqueous solvent recovered.

The dicarboxylic acids useful in the invention are organic compounds having two carboxyl groups. The carboxyl groups are pendant groups and can independently be terminal groups or side groups on the main chain. The related acid anhydrides of the dicarboxylic acids that can be used are five-or six membered ring structures including a fused ring portion formed of the two carboxyl groups. The pair of carboxyl groups in the dicarboxylic acids or acid anhydrides thereof can represent the only substituents (non-inclusive of hydrogen atoms) attached to the main chain. Alternatively, the dicarboxylic acid or acid anhydride thereof can possess other substituents in addition to the pair of carboxyl groups as long as the additional substituents do not interfere with, or otherwise hinder, the amidification reaction. The dicarboxylic acid main chains can be saturated or unsaturated at the various carbon-to-carbon bonds forming the main chain or backbone. The main chain preferably comprises 1–30 carbon atoms. Straight chains are usually preferable over branched chains due to steric effects. The carbon-to-carbon bonds forming the ring structure of the acid anhydrides can be saturated or unsaturated.

Preferred dicarboxylic acids and acid anhydrides thereof for use in the invention include those possessing polymerizable double bonds, more preferably conjugated double bonds. While not desiring to be bound to any particular theory at this time, it is postulated that double bonds present in the backbone or main chain of the dicarboxylic acid or anhydride thereof become polymerization sites when the $NH_2$ groups are exhausted. The polymerization of the double bonds between different chitosan molecules forms a network structure which serves to increase opportunities for unreacted amines to interact with free carboxyl groups in the system, thereby enhancing the advancement of crosslinking.

Double bonds that alternate with single bonds are said to be conjugated. As known, a conjugated system is characterized by a delocalized $\pi$-bond spread over the bond lengths of several linked carbon atoms due to them all contributing p-orbitals to the $\pi$-bond system, so that electron-rich atoms result at each carbon atom in the conjugated chain as a mesomeric effect. Useful conjugated systems include dicarboxylic acids or acid anhydrides thereof having isolated double bonds, cumulated double bonds, and $\alpha,\beta$-unsaturated carbonyl compounds.

In an $\alpha,\beta$-unsaturated carbonyl compound, the carbon-carbon double bond and the carbon-oxygen double bond are separated by only one carbon-carbon single bond. Examples of $\alpha,\beta$-unsaturated carbonyl compounds useful in the practice of this invention include, for example, maleic acid (cis-HOOCCH=CHCOOH), fumaric acid (trans-HOOCCH=CHCOOH), itaconic acid ("methylene succinic acid" $CH_2$=C(COOH)$CH_2$COOH), citraconic acid ($CH_3$C(COOH)=CHCOOH), maleic anhydride, itaconic anhydride, and citraconic anhydride.

The dicarboxylic acid compounds can be made by conventional methods, such as by hydrolysis of a dinitrile or a cyanocarboxylic acid, or oxidation of dimethylbenzene to yield a phthalic acid. The acid anhydrides can be formed by simple heating of the corresponding dicarboxylic acid to produce a ring structure, such as in case of maleic anhydride, succinic anhydride, and phthalic anhydride. For instance, when maleic acid is heated at 100° C., or when fumaric acid is heated at 250°–300° C., both acids yield the same anhydride, viz., maleic anhydride (cis-butenedioic anhydride).

Dicarboxylic acids and anhydrides thereof lacking carbon-carbon double bonds also can be used as they will react as long as COOH and $NH_2$ groups are present in equimolar amounts. For instance, other useful dicarboxylic acids and anhydrides thereof include oxalic acid (HOOC—COOH); malonic acid (HOOC$CH_2$COOH), succinic acid (HOOC($CH_2$)$_2$COOH), glutaric acid (HOOC($CH_2$)$_3$COOH), adipic acid (HOOC($CH_2$)$_4$COOH), phthalic acid (1,2-$C_6H_4$(COOH)$_2$), isophthalic acid (1,3-$C_6H_4$(COOH)$_2$), terephthalic acid (1,4-$C_6H_4$(COOH)$_2$), succinic anhydride, phthalic anhydride. Other dicarboxylic acids that can be used include substituted dicarboxylic acids, such as malic acid (HOOC—CH(OH)$CH_2$—COOH) or aldaric acids (HOOC—(CHOH)$_n$—COOH where n=1 or more) such as tartaric, glucaric, mannaric, xylaric acids, and the like; and dimethoxy carboxylates such as dimethoxy succinic acid (HOOC—CH(O$CH_3$)C(O$CH_3$)HCH(O$CH_3$)—COOH) which also will undergo removal of methanol during amidification. The dicarboxylic acid also can be a polycarboxylic acid such as pectin, xylan carboxy methyl cellulose, and the like.

In addition to the techniques for crosslinking chitosan provided by the invention, chitosan beads of the invention additionally can be subjected to activation reactions which result in altered functionality and altered solubility. For instance, chitosan beads in solid form, in non-aqueous suspension, can be reacted with a quaternizing reagent, such as a glycidyl quaternary salt, to form a quaternized functional chitosan hydrogel.

An example of a suitable quaternizing compound in this regard is glycidyl trimethyl ammonium chloride, which can have the structure represented by Formula (II) as follows:

(II)

Chitosan beads so derivatized, i.e., quaternized, reveal significant solubility in both aqueous dilute acids and neutral water (pH=7). This functionalization by quaternization is highly beneficial for the sorption properties of chitosan beads and can be used for separations in biotechnology (e.g., protein separations). Quaternized chitosan tends to be soluble in aqueous environments. However, solubility in water and dilute acids is overcome in the present invention when the functionalized beads are subsequently subjected to amidification and crosslinking with dicarboxylic acids or acid anhydrides thereof according to the present invention. Quaternized chitosan beads crosslinked with either itaconic or maleic anhydride according to the invention, for instance, have been observed to be both (a) insoluble in acid, water, or alkali; and (b) quaternized so as to possess highly adsorbent functional groups for protein adsorption.

Figure 3:
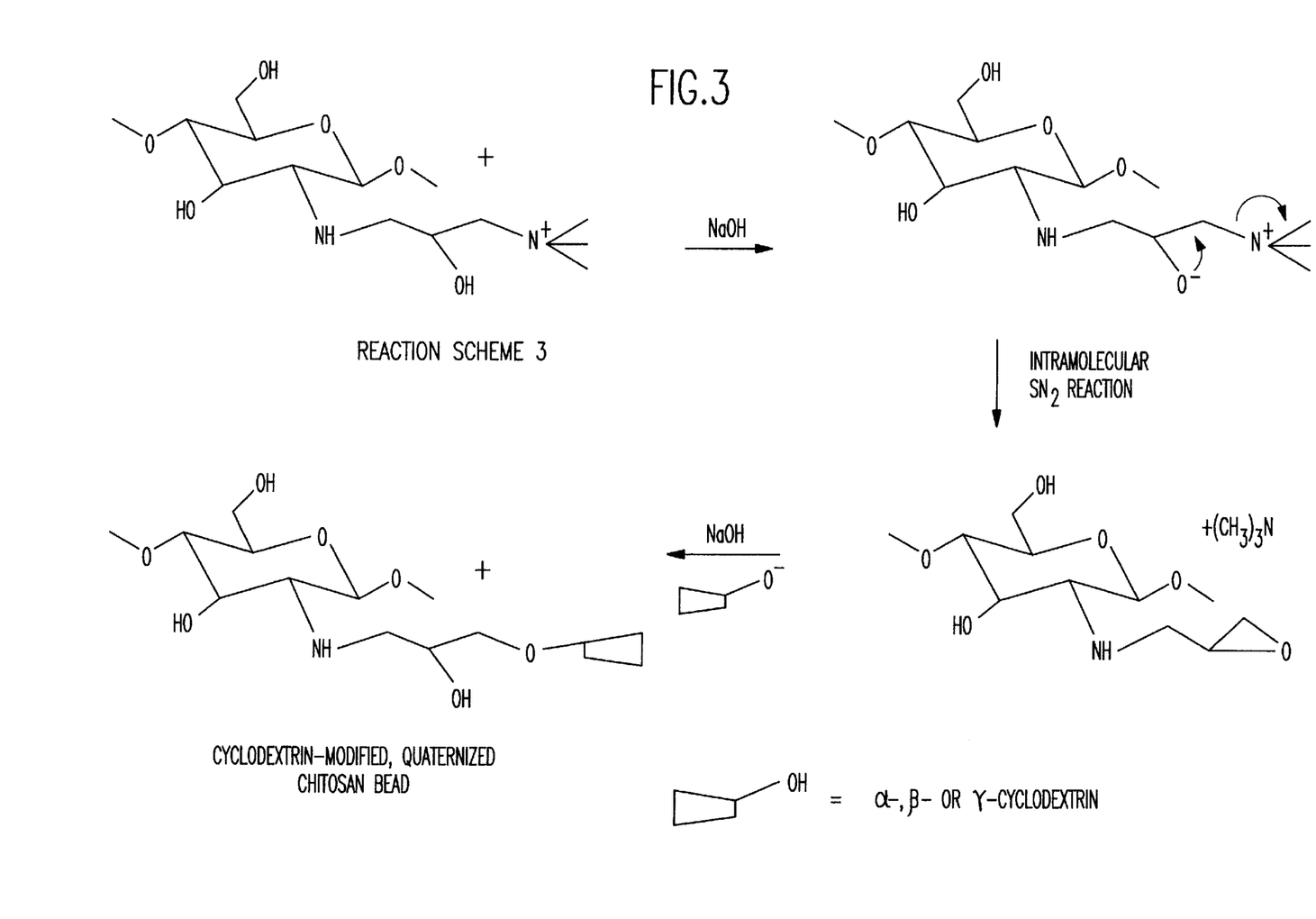
FIG. 3 is a schematic representation of a reaction of quaternary amine with cyclodextrins according to Reaction Scheme 3 of this invention.

The quaternized chitosan beads in non-aqueous suspension can be further functionalized with $\alpha$-, $\beta$-, or $\gamma$-cyclodextrin. The basic chemical reaction pathway of the cyclodextrin (secondary) functionalization is shown in Reaction Scheme 3 depicted in FIG. 3, which is a schematic representation of the reaction of quaternary amine with cyclodextrins.

The cyclodextrin functionalized chitosan beads are highly beneficial for chiral separations. They are insoluble in aqueous medium over a wide pH-range. The crosslinked-cyclodextrin functionalized chitosan beads obtained according to the amidification crosslinking reaction with itaconic, citraconic or maleic acid or anhydrides thereof are insoluble in acid, water, or alkali, and they possess the functional groups needed for chiral separations.

The quaternary functionalization reaction and the secondary cyclodextrin-modification reaction for the chitosan can employ reaction conditions (temperature and time) similar to those described above for performing the crosslinking reactions for a common type of chitosan salt and solvent.

Figure 4:
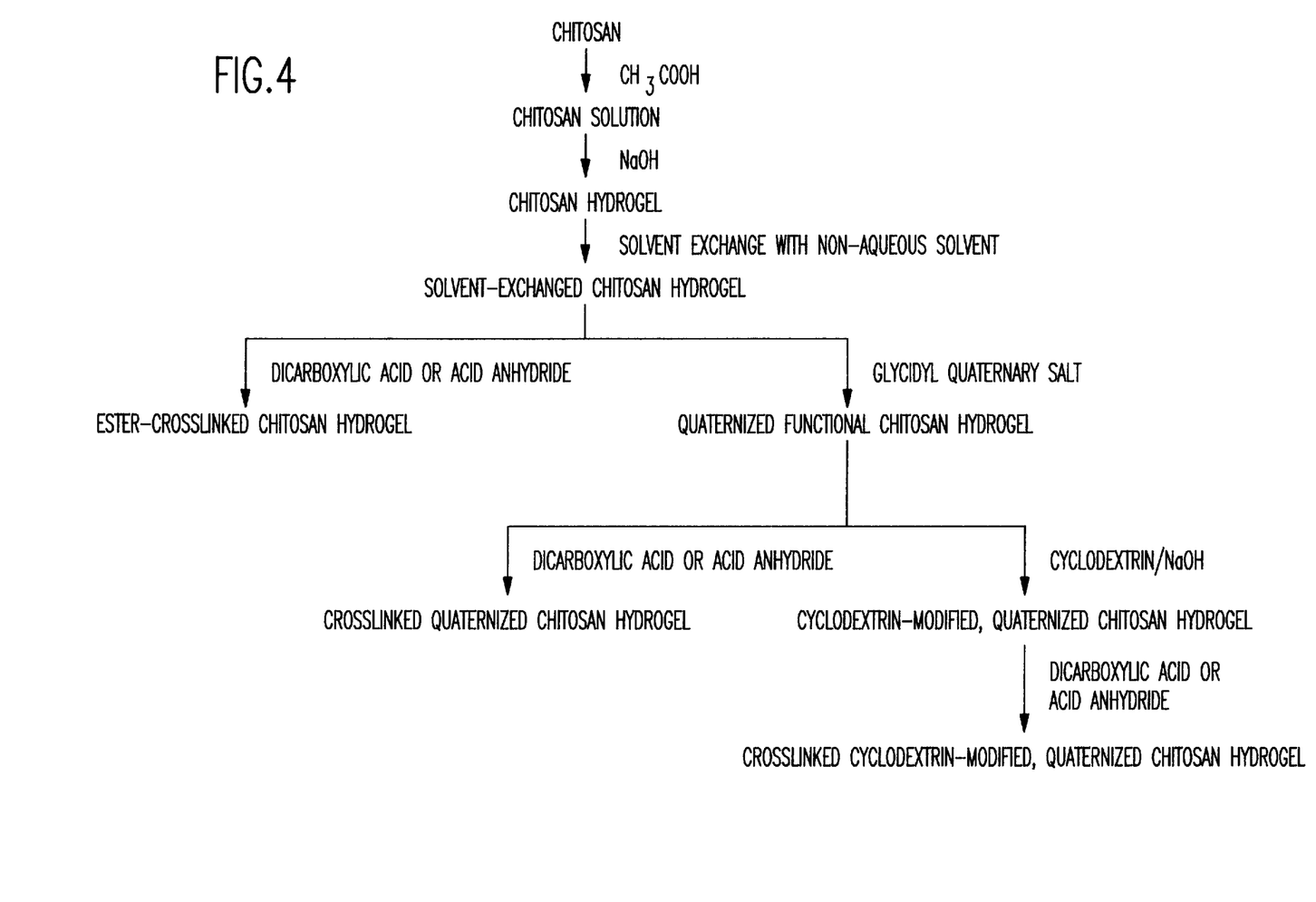
FIG. 4 is a flow diagram of processes according to this invention for ester crosslinking and functionalization of chitosan hydrogels.
Figure 5:
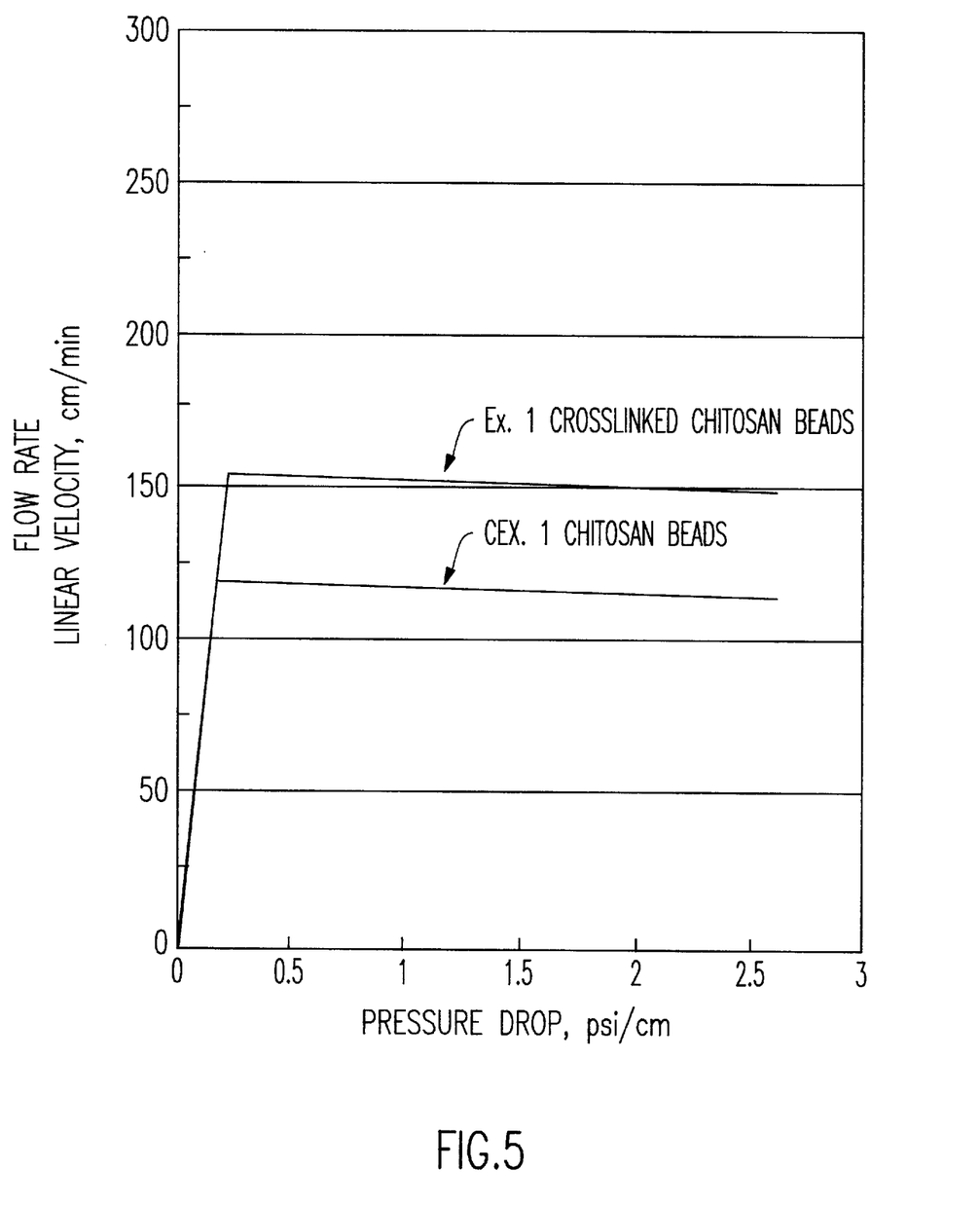
FIG. 5 is a diagram showing the relation between the column pressure drop and the linear velocity as a measure of bead strength for ester-crosslinked chitosan beads made according to the present invention compared to non-crosslinked chitosan beads.

FIG. 4 is a detailed flow diagram summarizing processes described herein according to this invention for ester crosslinking including optional functionalization(s) of the chitosan hydrogels.

As apparent from the descriptions herein, the method of the invention using heat-induced amidification chemistries involving dicarboxylic acid or related acid anhydride reagents enables the production of crosslinked, highly expanded chitosan beads, optionally functionalized in any one of several functionalities such as described herein, in solid form without distortion or loss of the original bead shape. Also, the crosslinking reaction of the present invention provides reliable results that can be easily assessed by monitoring solubility characteristics of the bead product.

The inventive reaction scheme, when adapted to dicarboxylic acids and related acid anhydrides in conjunction with porous chitosan beads, results in separation products, such as chromatographic support materials, endowed with greatly engineered solubility and strength characteristics. The crosslinked chitosan bead products of this invention afford excellent intra-particle transport in separations, and the level and type of derivatization of the crosslinked beads can be tailored to enhance the separation procedure envisaged. Regular bead shapes (e.g., spherical shapes) are preferred in many but not necessarily all applications.

Further, the methodology of crosslinking chitosan beads is adaptable to beads previously activated by reaction with modifying reagents such as ordinary quaternary ammonium substituents, cyclodextrin-modified quaternary ammonium substituents, complexed with heavy metal salts, and the like. The inventive methods for activating chitosan and crosslinking by reaction with dicarboxylic acids or anhydrides thereof produce separation materials with great versatility and utility. The activated, crosslinked chitosan materials formed by the inventive methods can be effectively used as chromatographic supports such as in biotechnology applications, as well as in waste water treatment.

This invention will now be understood more readily with reference to the following examples. However, these examples are intended merely to illustrate the invention and are not to be construed as limiting the scope of the invention. In the examples, all weights, percentages, and amounts therein are by weight unless indicated otherwise.

EXAMPLES

Preparation of Chitosan Starting Material

For purposes of the following examples, chitosan starting material was prepared as follows. Chitosan flakes were dissolved in 1 to 5 wt. % acetic acid to provide a chitosan concentration between 0.5 to 3 wt. % by stirring at room temperature. The dissolved chitosan was centrifuged to remove extraneous matter. The solution of chitosan was atomized into a 0.1 to 2N aqueous sodium hydroxide solution to form chitosan hydrogels in bead form. The chitosan beads were removed from the sodium hydroxide solution by decantation and filtration. The beads were washed with distilled water in a glass column by standing in water for 30 minutes and then replacing with fresh distilled water several times to obtain chitosan beads at a neutral pH. The beads were kept in water and stored in a closed container. The solids content of the beads were between 1 and 5 wt. % as determined by lyophilization and thermogravimetric analysis (TGA).

Example 1

An aqueous suspension of chitosan beads prepared from the Preparation Procedure for Chitosan Starting Material was transferred to a sintered glass Büchner funnel and excess water was removed by suction. 5 g of the moist chitosan beads (solids content 3.4 wt. %) were immersed in 30 mL isopropyl alcohol and allowed to exchange with water inside the beads by stirring for 30 minutes. The isopropyl alcohol was filtered away and then replaced with a fresh batch of 30 mL of isopropyl alcohol. The mixture was stirred for 30 minutes. The solvent exchange process was repeated 3 times to exchange almost all water from the beads to isopropyl alcohol.

The isopropyl alcohol-exchanged chitosan beads (never-dried) were suspended in 30 mL isopropyl alcohol and 400 mg itaconic anhydride was added to the bead suspension. The reaction mixture was refluxed for 16 hours at a temperature of 82° C., and then cooled to room temperature. The crosslinked chitosan beads obtained were washed twice with 30 mL portions of isopropyl alcohol and then three times with 30 mL portions of distilled water by stirring for 30 minutes each. The crosslinked chitosan beads were stored in water. The solids content of the chitosan itaconate beads was 8.8 wt. % as determined by TGA. The carboxylic functionality in the crosslinked chitosan beads was examined by FTIR (1715 cm$^{-1}$). The crosslinked beads were tested with regard to their solubility in each of 5 wt. % acetic acid, neutral pH water, and 0.2N sodium hydroxide solution by completely immersing a fraction of the crosslinked chitosan beads in each of the dilute acid, neutral, and dilute alkali solutions for a period of 24 hours with stirring. The solids content of the chitosan itaconate beads for each sample was determined again by TGA and found again to be 8.8 wt. %. The beads were found to be insoluble in dilute acetic acid, neutral pH water, and dilute sodium hydroxide solution.

To assess the effects of the ester crosslinking on the strength and flow characteristics of the chitosan beads, a sample of the chitosan itaconate beads (designated "Ex. 1") prepared as above and a separate sample for comparison of the chitosan beads prepared from the Preparation Procedure for Chitosan Starting Material (designated "CEx. 1") were subjected to flow experiments in a chromatographic packed column (40×1.6 cm i.d.). The pressure was recorded using distilled water as mobile phase. The results are summarized in FIG. 2, which show the enhanced strength of the beads crosslinked according to the invention.

Also for the sake of comparison, a separate sample of the chitosan beads prepared from the Preparation Procedure for Chitosan Starting Material, which were untreated by dicarboxylic acids or acid anhydrides according to the above crosslinking reaction, were tested for solvent solubilities in the same manner as above. These tests confirmed the insolubility in water and alkali, and solubility in dilute acid, of the chitosan starting beads before inducing crosslinking, as would be expected.

Example 2

The same procedure as in Example 1 was used except that 400 mg of maleic anhydride was used instead of the 400 mg of itaconic anhydride. The reaction time was again 16 hours. The crosslinked chitosan maleate beads had a solids content of 5.8 wt. % according to TGA. The crosslinked chitosan maleate beads produced were insoluble in dilute acetic acid, neutral pH water, and dilute sodium hydroxide solution with insolubility tested and determined in the same manner as in Example 1.

Example 3

The same procedure as in Example 1 was used except that 400 mg of citraconic anhydride was used instead of the 400 mg of itaconic anhydride. The reaction time was again 16 hours. The crosslinked chitosan citraconate beads had a solids content of 4.5 wt. % according to TGA. The crosslinked chitosan citraconate beads produced were insoluble in dilute acetic acid, neutral pH water, and dilute sodium hydroxide solution with insolubility tested and determined in the same manner as in Example 1.

Example 4

The same procedure as in Example 1 was used except that a mixture of 200 mg itaconic anhydride and 200 mg of maleic anhydride was used in instead of 400 mg of itaconic anhydride. The reaction time was again 16 hours. The crosslinked chitosan itaconate-maleate beads had a solids content of 8.8 wt. % according to TGA. The crosslinked chitosan itaconate-maleate beads produced were insoluble in dilute acetic acid, neutral pH water, and dilute sodium hydroxide solution with insolubility tested and determined in the same manner as in Example 1.

Example 5

The same procedure as in Example 1 was used except that 400 mg of succinic anhydride was used in instead of 400 mg of itaconic anhydride. The reaction time was again 16 hours. The crosslinked chitosan succinate beads had a solids content of 5.7 wt. % according to TGA. The crosslinked chitosan succinate beads produced were insoluble in dilute acetic acid and neutral pH water, and soluble in dilute sodium hydroxide solution with insolubility tested and determined in the same manner as in Example 1.

Example 6

The same procedure as in Example 1 was used except that 400 mg of fumaric acid was used in instead of 400 mg of itaconic anhydride. The reaction time was 48 hours for this example. The crosslinked chitosan fumarate beads had a solids content of 1.6 wt. % according to TGA. The crosslinked chitosan fumarate beads produced were insoluble in dilute acetic acid, neutral pH water, and dilute sodium hydroxide solution with insolubility tested and determined in the same manner as in Example 1.

Example 7

The same procedure as in Example 1 was used except that 400 mg of itaconic acid was used in instead of 400 mg of itaconic anhydride. The reaction time was again 16 hours. The crosslinked chitosan itaconate beads had a solids content of 1.3 wt. % according to TGA. The crosslinked chitosan itaconate beads produced were insoluble in dilute acetic acid, neutral pH water, and dilute sodium hydroxide solution with insolubility tested and determined in the same manner as in Example 1.

Example 8

The same procedure as in Example 1 was used except that 400 mg of maleic acid was used instead of the 400 mg of itaconic anhydride. The reaction time was again 16 hours. The crosslinked chitosan maleate beads had a solids content of 1.6 wt. % according to TGA. The crosslinked chitosan maleate beads produced were insoluble in dilute acetic acid, neutral pH water, and dilute sodium hydroxide solution with insolubility tested and determined in the same manner as in Example 1.

Example 9

The same procedure as in Example 1 was used except that 400 mg of citraconic acid was used instead of the 400 mg of itaconic anhydride. The reaction time was again 16 hours. The crosslinked chitosan citraconate beads had a solids content of 5.8 wt. % according to TGA. The crosslinked chitosan citraconate beads produced were insoluble in dilute acetic acid, neutral pH water, and dilute sodium hydroxide solution with insolubility tested and determined in the same manner as in Example 1.

Example 10

Functionalized (quaternized) chitosan beads were prepared as follows. The same solvent-exchange and reaction procedures as in Example 1 were used except that 400 mg of glycidyl trimethylammonium chloride was used instead of the 400 mg of itaconic anhydride to effect modification (activation) of the chitosan beads and not crosslinking in the reaction. The quaternization reaction time was 16 hours. The activated beads formed were washed with 5×30 mL of isopropyl alcohol only, without using the final water washing treatment described in Example 1. The quaternized chitosan beads were stored in isopropyl alcohol (not water). The quaternized chitosan beads had a solids content of 7.9 wt. % according to TGA. The quaternized chitosan beads produced were soluble in dilute acetic acid and neutral pH water, and insoluble in dilute sodium hydroxide solution as tested in the same manner as in Example 1.

Example 11

A sample of the quaternized chitosan beads as prepared and stored in isopropyl alcohol in Example 10 were crosslinked with 400 mg of itaconic anhydride in 30 mL of isopropyl alcohol according to the procedure of Example 1 except without (need for) the preliminary solvent exchange procedure being performed immediately before the crosslinking reaction. The crosslinking reaction time was 16 hours. The crosslinked, quaternized functional chitosan itaconate beads were insoluble in dilute acetic acid, neutral pH water, and dilute sodium hydroxide solution with insolubility tested and determined in the same manner as in Example 1.

Example 12

Figure 6:
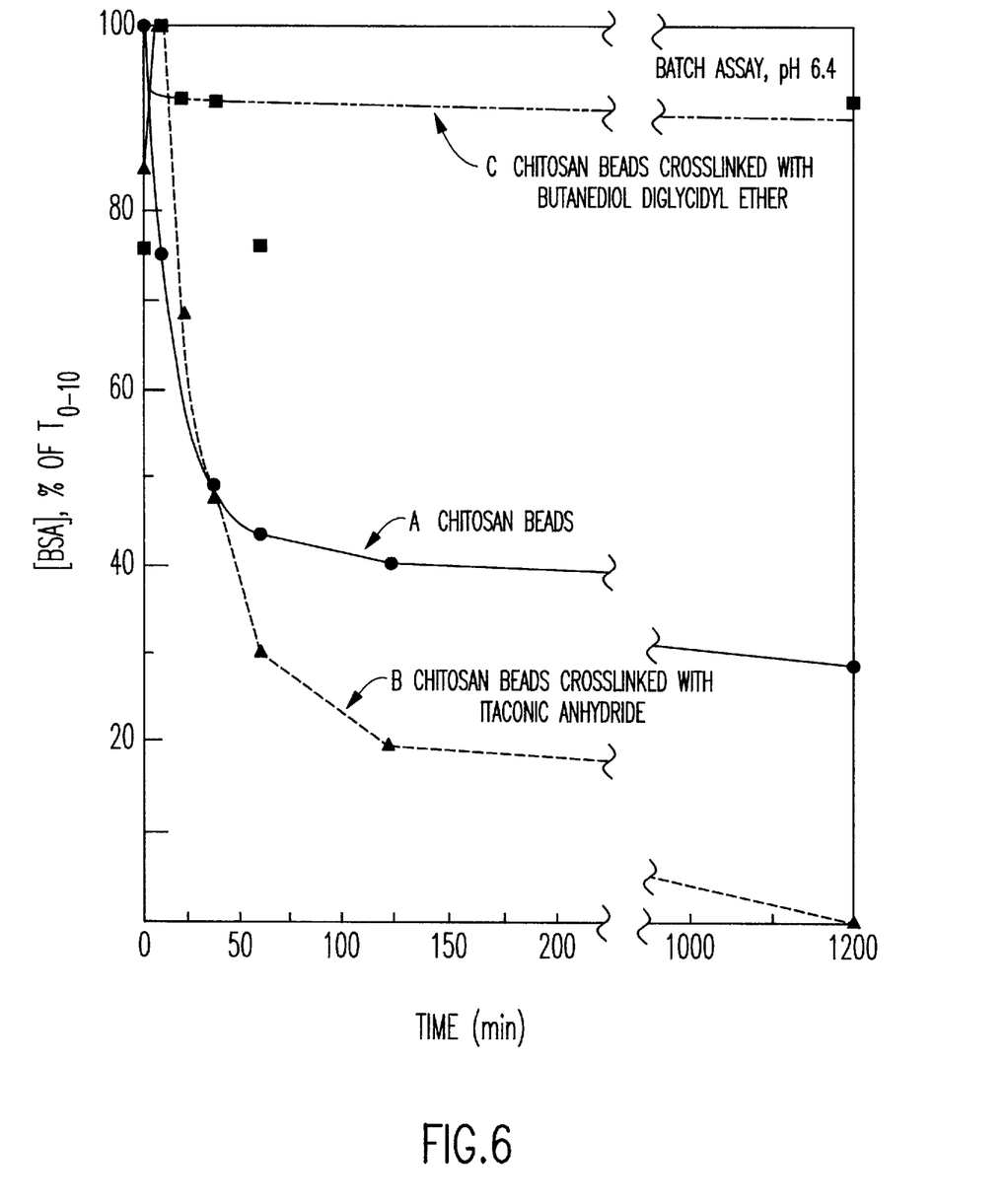
FIG. 6 is a diagram showing the relation between the BSA (bovine serum albumin) binding capacity with time for ester-crosslinked chitosan beads made according to the present invention compared to chitosan beads crosslinked via a conventional procedure using butanediol diglycidyl ether.

To assess the effects of the functionalization of the crosslinked chitosan beads with a quaternary trimethyl ammonium chloride substituent on protein sorption, a sample of crosslinked quaternized chitosan beads and two separable samples of unmodified crosslinked chitosan beads and quaternized chitosan beads crosslinked in the conventional manner with diglycidyl ether, were subjected to a static sorption tests with bovine serum albumin (BSA) solutions. The adsorption of BSA on chitosan beads in suspension was monitored by assaying for BSA concentration in the supernatent with time. The results, shown in FIG. 6, indicate BSA sorption isotherms for the three bead types that differ significantly in capacity.

For this study, a sample of chitosan beads prepared from the Preparation of Chitosan Starting Material was the control and designated Sample A. To represent the crosslinked chitosan beads made by the present invention, a sample of chitosan glycidyl ammonium salt beads crosslinked with itatonic anhydride, and designated Sample B, was prepared in the same manner as Example 11. For comparative purposes, a sample of chitosan glycidyl ammonium salt beads, as prepared in the same manner as Example 10, was crosslinked instead with 0.5 mL of butanediol diglycidyl ether as a conventional chitosan crosslinking reagent in 30 mL of isopropyl alcohol otherwise following the procedure of Example 1 except also without (need for) the preliminary solvent exchange procedure being performed immediately before the crosslinking reaction, to provide quaternized chitosan beads crosslinked with butanediol diglycidyl ether, designated as Sample C. Each of Samples A, B, and C was tested for BSA binding capacity by batch assay at pH 6.5. The data observed and recorded for these tests in terms of binding capacity as a function of time is plotted in FIG. 6 with curves indicated for Sample A (●), Sample B(▲), and Sample C (■). The overall test results are summarized in Table 1 below.

TABLE 1

| Sample | Bead Type | Modification | Bead Solids Content (%, w/w) | Capacity[1] (g/g) | Capacity[2] (mg/mL) |
|---|---|---|---|---|---|
| A | Chitosan Beads | Control | 3.0[3] | 0.39 | 11.7 |
| B | Crosslinked Quaternized Chitosan Beads | Crosslinked with itaconic anhydride | 1.5[4] | 3.02 | 45.3 |
| C | Crosslinked Quaternized | Crosslinked with butanediol | 3.0[4] | 1.67 | 50.0 |

TABLE 1-continued

| Sample | Bead Type | Modification | Bead Solids Content (%, w/w) | Capacity[1] (g/g) | Capacity[2] (mg/mL) |
|---|---|---|---|---|---|
| | Chitosan Beads | diglycidyl ether | | | |

[1]BSA solids adsorbed by hydrogel beads, in g per g of bead solids;
[2]BSA solids adsorbed by hydrogel beads, in mg per mL of bead volume (i.e., measured gravimetrically on beads drained of all free water);
[3]determined by lyophilization;
[4]determined by thermogravimetric analysis (TGA)

The results of Table 1 show that the unmodified chitosan beads of Sample A (control) had a BSA binding capacity of 0.39 g per g of beads. The quaternized chitosan beads of Sample B crosslinked according to the present invention had a BSA binding capacity of 3.02 g per g of beads, which was almost 8 times greater than that of the noncrosslinked chitosan beads of Sample A. The quaternized chitosan beads crosslinked conventionally with butanediol diglycidyl ether (Sample C) had a BSA binding capacity of 1.67 g per g of beads, which was about 4 times that of the noncrosslinked chitosan beads of Sample A, but only about 55% of the binding capacity (on a wt./wt. basis) achieved with Sample B. The results indicated that the functionalized chitosan beads crosslinked by the present invention (i.e., Sample B) had superior protein binding capacity as compared to nonfunctionalized, crosslinked chitosan beads as well as to functionalized chitosan beads crosslinked with conventional crosslinking reagents (i.e., Sample C).

Example 13

A sample of the quaternized chitosan beads as prepared and stored in Example 10 were secondarily functionalized with 200 mg of β-cyclodextrin in 20 mL of isopropyl alcohol containing 10 mL 0.1N sodium hydroxide according to the procedure of Example 1 except without (need for) the preliminary solvent exchange procedure being performed immediately before the secondary functionalization reaction. The functionalization reaction time was 16 hours. The cyclodextrin-modified, quaternized functional chitosan beads had a solids content of 50.3 wt. % according to TGA. The glucose content in the beads was found to be 32.6 wt. % by carbohydrate analysis (control: 0%). The cyclodextrin-modified, quaternized functional chitosan beads were soluble in dilute acetic acid and neutral pH water, and insoluble in dilute sodium hydroxide solution with insolubility tested and determined in the same manner as in Example 1.

Example 14

A sample of the cyclodextrin-modified, quaternized chitosan beads as prepared in Example 13 were crosslinked with 400 mg itaconic anhydride in 30 mL isopropyl alcohol according to the procedure of Example 1 except without (need for) the preliminary solvent exchange procedure being performed before the crosslinking reaction. The crosslinking reaction time was 16 hours. The crosslinked, cyclodextrin-modified, quaternized functional chitosan beads were insoluble in dilute acetic acid, neutral pH water, and dilute sodium hydroxide solution with insolubility tested and determined in the same manner as in Example 1.

The results for Examples 1–4, 6–9, 11, and 13 indicated that the chitosan beads were completely crosslinked. As to Example 5, the chitosan beads treated with succinic anhydride were insoluble in acid and neutral water, but were soluble in alkali. This result indicated that the reaction only advanced to the intermediate derivative, i.e., the amidified, but uncrosslinked chitosan material. This result for Example 5 was attributed to insufficient residual amine functionality or to undue amounts of residual water present in the solvent-exchanged chitosan hydrogel at the time of performing ester-crosslinking. Techniques for preserving unreacted-$NH_2$-groups and/or for rigorously removing such residual traces of water, such as described herein above, should rectify this result.

While the invention has been described in terms of its preferred embodiments, those skilled in the art will recognize that the invention can be practiced with modification within the spirit and scope of the appended claims.

What is claimed is:

1. A method for forming crosslinked chitosan from chitosan support material containing water, comprising the steps, in this sequence, of:

(a) replacing said water from said chitosan support material with a polar, non-aqueous organic fluid;

(b) combining said chitosan support material with a sufficient amount of dicarboxylic acid or acid anhydride thereof to form a chitosonium ion complex, wherein said dicarboxylic acid or acid anhydride thereof includes a polymerizable carbon-carbon double bond; and (c) heating said chitosonium ion complex effective to drive off water via amidification reaction and crosslink said chitosan support material.

2. The method of claim 1, wherein step (c) comprises a first substep and a second substep, wherein said first substep comprises heating said chitosonium ion complex effective to form an intermediate product comprising a non crosslinked, monocarboxylic acid derivative of said chitosonium ion complex, and said second substep comprises heating said intermediate product effective to form a crosslinked chitosan complex.

3. The method of claim 2, wherein said chitosan support material has a shape selected from the group consisting of beads, films, and fibers.

4. The method of claim 1, wherein said chitosan support material comprises beads.

5. The method of claim 1, wherein said chitosan support material comprises spherical beads.

6. The method of claim 1, wherein said chitosan support material comprises chitosan polymers having amine sites, and said chitosan support material comprises a porous network structure having both an exterior surface and an internal surface, and wherein said amine sites on said chitosan polymers in said chitosan support material are reacted during said heating step at locations both on said internal surface and on said exterior surface.

7. The method of claim 1, wherein said polar non-aqueous organic fluid is selected from the group consisting of isopropyl alcohol, acetone, chloroform, tetrahydrofuran, dioxane, benzene, toluene, and xylene.

8. The method of claim 1, wherein said dicarboxylic acid or acid anhydride thereof is a compound selected from the group consisting of maleic acid, fumaric acid, itaconic acid, citraconic acid, maleic anhydride, itaconic anhydride, and citraconic anhydride.

9. The method of claim 1, wherein said crosslinked chitosan support material are beads having 1 to 3 wt. % solids and having an average particle diameter size greater than about 0.3 mm.

10. The method of claim 1, wherein said crosslinked chitosan support material are beads having 1 to 3 wt. % solids and having an average particle diameter size ranging from about 0.5 mm to about 2.0 mm.

11. The crosslinked chitosan support material product of the method of claim 1.

12. The crosslinked chitosan beaded product of the method of claim 4.

13. The crosslinked chitosan beaded product of the method of claim 10.

14. The method of claim 1, further comprising performing, after step (c), a step (d) comprising replacing said polar, non-aqueous organic fluid in said crosslinked chitosan support material with an aqueous fluid.

15. The method of claim 1, wherein said dicarboxylic acid or acid anhydride thereof is an $\alpha,\beta$-unsaturated carbonyl compound.

* * * * *